March 22, 1966   R. W. ROBERTS   3,241,320
ACCESSORY DRIVE MECHANISM
Filed Nov. 13, 1964   3 Sheets-Sheet 1

Inventor:
Richard W. Roberts
By: Robert L. Zieg  Atty.

Inventor:
Richard W. Roberts
By: Robert L. Zieg

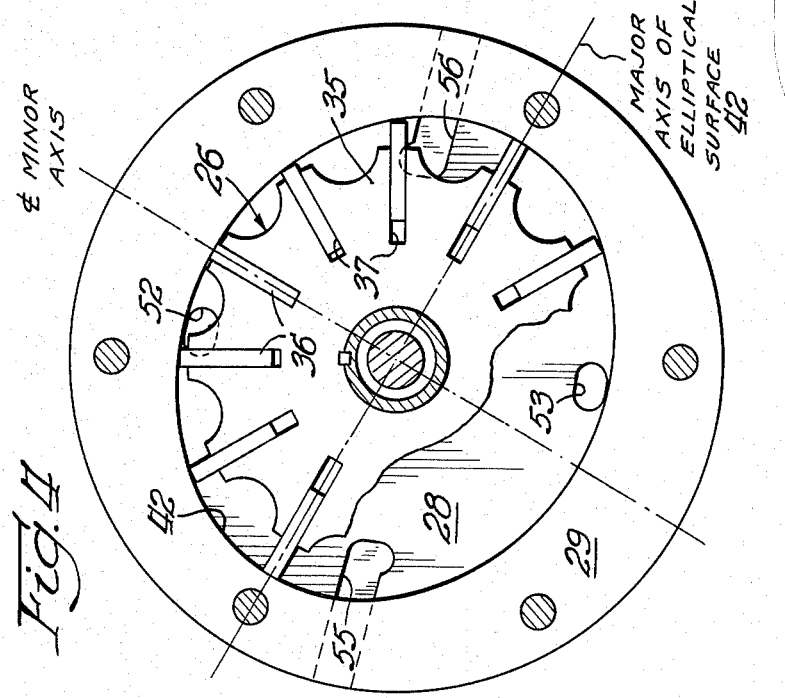
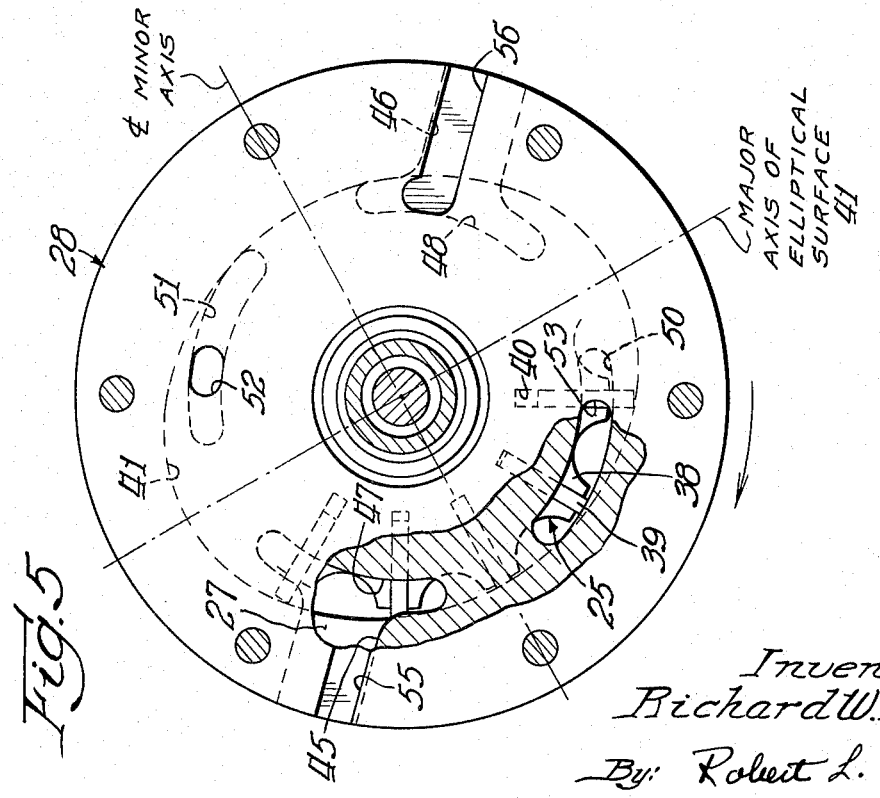

United States Patent Office 3,241,320
Patented Mar. 22, 1966

3,241,320
ACCESSORY DRIVE MECHANISM
Richard W. Roberts, Lombard, Ill., assignor to Borg-Warner Corporation, a corporation of Illinois
Filed Nov. 13, 1964, Ser. No. 410,859
7 Claims. (Cl. 60—53)

This invention relates to an accessory drive mechanism for driving an accessory of an automobile vehicle.

More particularly this invention relates to an accessory drive mechanism of the type utilizing fluid pump and motor units as a variable speed transmission to drive an accessory. In this manner the particular automotive accessory to be driven can be driven at or close to a constant speed regardless of engine speed thereby preventing a loss of or wasted power in driving an accessory at higher speeds than necessary.

Accordingly it is an object of the present invention to provide an accessory drive mechanism in which the speed of the accessory as driven by the engine may be held constant regardless of engine speed.

Further it is an object of the invention to provide an accessory drive mechanism utilizing fluid pump and motor units wherein the drive transmission is entirely enclosed within a casing completely filled with oil to provide sound-deadening qualities.

It is a further object of this invention to provide an accessory drive mechanism of the type described wherein a means is provided to maintain the fluid within the casing of the transmission at a predetermined pressure to eliminate the need for a charge pump and prevent cavitation of the oil by providing adequate pressure at the inlet openings and thereby add to the noise-deadening characteristics.

These and other advantages of this invention will be apparent from the following description and claims taken in conjunction with the accompanying drawings in which:

FIGURE 4 is a sectional view taken along the line 4—4 of FIGURE 1; and

FIGURE 5 is a sectional view taken along the line 5—5 of FIGURE 1.

Figure 1:
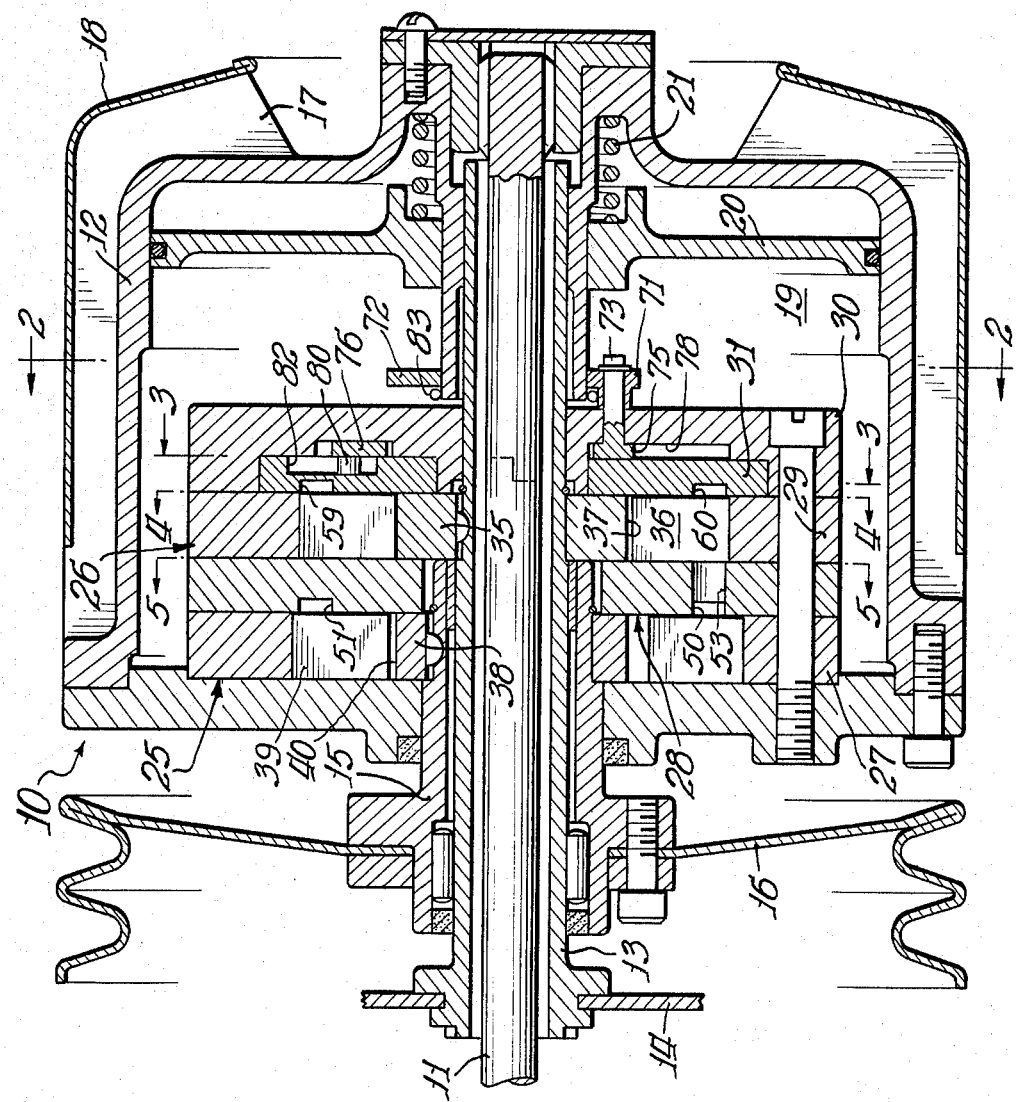
FIGURE 1 is a longitudinal section through a hydraulic accessory drive mechanism constructed in accordance with the principles of the invention.

Referring to FIGURE 1, the accessory drive mechanism 10 comprises an input shaft 11 adapted to be connected to an engine and a rotary casing 12 connected by splines with the input shaft 11 to be driven thereby. A hollow sleeve shaft 13 is provided which is secured to a stationary part of the vehicle by the plate 14 partially illustrated in FIGURE 1 to provide a reaction member for the accessory drive. A hollow output shaft 15 is concentric with the shafts 11 and 13 and is drivingly connected by bolts to a pulley 16 adapted to drive an engine accessory. The casing 12 has a plurality of ribs 17 formed thereon and enclosed with a shroud 18 surrounding the casing. Within the casing 12 is a cavity which includes a piston 20 slideable therein. The piston 20 is engaged by a spring 21 extending between the piston 20 and the casing 12.

The function of the piston 20 is to maintain a predetermined pressure of fluid within the cavity 19 which will be completely filled with fluid. The fluid will be added under pressure to the cavity 19 which would serve to slide the piston 20 to the right against the force of spring 21 until a certain pressure is established by the piston.

The hydraulic transmission for driving the accessory includes a fluid pump 25 and a fluid motor unit 26. The assembly making up the hydraulic transmission includes a cam ring 27 for the pump unit 25, a relatively fixed port plate 28, a cam ring 29 for the motor unit 26 and an end plate 30. The two cam rings 27 and 29 and the fixed port plate 28 and the end plate 30 are all bolted as illustrated in FIGURE 1 to the rotating casing 12 for rotation therewith.

A rotatable port plate 31 is provided which is mounted within the end plate 30 and which is adapted to be rotated by a centrifugal speed-responsive device to be later described.

Referring to FIGURES 1, 4 and 5, the motor unit 26 is provided with a rotor 35 which has vanes slidable in slots 37 provided in the rotor. The rotor 35 of the motor unit 26 is keyed to the stationary hollow shaft 13, and is therefore a fixed rotor.

The pump unit 25 is provided with a rotor 38 having vanes moveable in slots 40 provided in the rotor 38. The rotor 38 is drivingly connected to the hollow output shaft 15 which drives the pulley 16.

The cam ring 27 has an elliptical internal cam surface 41 engaged by vanes 39 on rotor 38 and cam ring 29 has an elliptical internal cam surface 42 engaged by vanes 36 on rotor 35. The major axes for elliptical surfaces 41 and 42 are labelled in FIGURES 4 and 5 of the drawings.

Inlet ports 45 and 46 are provided in the port plate 28 which communicate with the fluid-filled cavity 19 and with extended inlet ports 47 and 48 formed in the port plate 28 and are 180° opposed. Fluid outlet ports 50 and 51 are provided in the port plate 28 which are 180° opposed and the centers of which are on the axis which is at right angles to an axis through the inlet ports 47 and 48. Passages 52 and 53 are provided for each of the outlet ports 50 and 51 which pass entirely through the port plate 28 and serve as fluid inlets for the motor unit 26.

Figure 3:
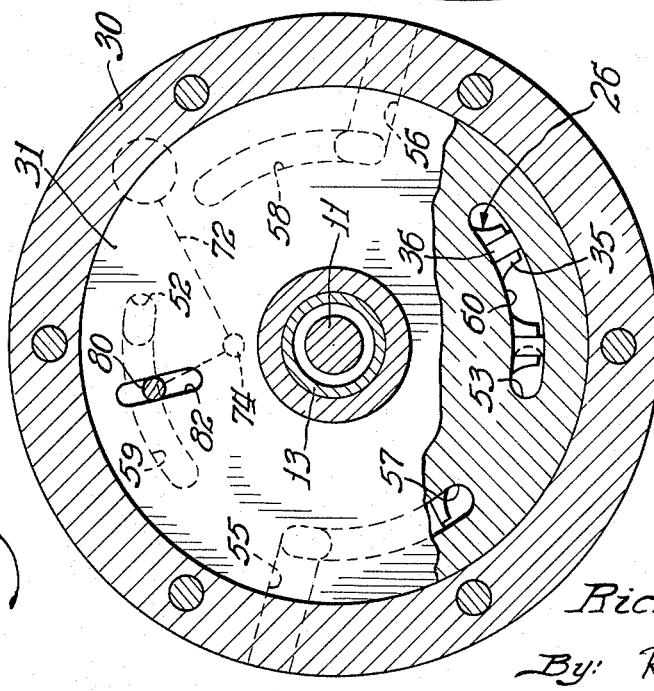
FIGURE 3 is a sectional view taken along the lines 3—3 of FIGURE 1.

As viewed in FIGURE 4 fluid outlet passages 55 and 56 are provided for motor unit 26 in the port plate 28. The fluid outlet passages 55 and 56 are on the axis 180° opposed and perpendicular to an axis through the inlet passages 52 and 53. As illustrated in FIGURE 3 the outlet passages 55 and 56 are in communication across the areas between the vanes 36 and the rotor 35 with elongated outlet ports 57 and 58 formed in the rotatable port plate 31. Elongated inlet ports 59 and 60 are formed in the rotatable port plate 31 which are in communication with inlet passages 52 and 53 respectively across the openings between the vanes 36 of the rotor 35.

Figure 2:
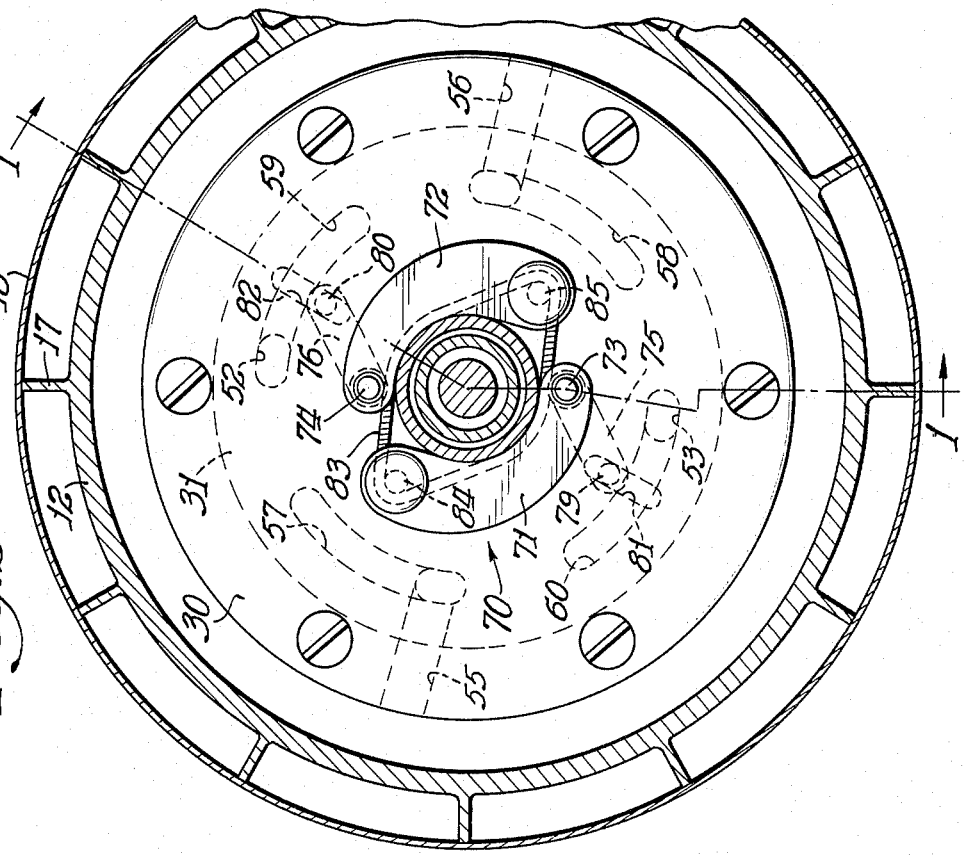
FIGURE 2 is a sectional view taken along the lines 2—2 of FIGURE 1.

Referring to FIGURE 2, a speed-responsive mechanism 70 is provided for rotating the rotatable port plate 31 to vary the capacity of the motor unit 26. The governor mechanism 70 includes a pair of weights 71 and 72 which are rotatably fixed on journals 73 and 74. Links 75 and 76 are housed in a cutout or relieved portion 78 of the rotatable port plate 31. Pins 79 and 80 are fixed on the links 75 and 76 respectively and are received in slots 81 and 82 provided in the rotatable port plate 31. A coil spring or elastic member 83 is provided which engages pins 84 and 85 on the weights 71 and 72. The spring 83 holds the centrifugal weights 71 and 72 in their inner position as shown in FIGURE 2 and will do so until a predetermined r.p.m. of the casing 12 is attained.

The operation of the hydraulic accessory drive mechanism unit is as follows: shaft 11 is driven by the engine and turns the casing 12 of the accessory drive unit.

The porting for the pump unit 25 is fixed and does not change during the operation of the accessory drive mechanism. Initially, as the casing 12 begins to turn, relative rotation will occur between the cam ring and rotor 38. The relative rotation between the cam ring 27 and the rotor 38 will be in the direction as indicated by the arrow in FIGURE 5. As the relative rotation occurs fluid will be drawn into the elongated ports 47 and 48 through inlet ports 45 and 46, since the inlet ports 47 and 48 distribute the fluid to increasing displacement areas between the vanes 39 on the rotor 38. The fluid between the vanes 39 will be communicated to the passages 52 and 53 in the port plate 28 by means of the ports 50 and 51. The fluid displacement areas between the vanes 39 are decreasing as the vanes pass ports 50 and 51 and thus fluid will be squeezed into ports 50 and 51 and fluid passages 52 and 53.

At low engine speeds, for example below 1500 r.p.m., the centrifugal weights 71 and 72 will be in the position illustrated in FIGURE 2 which corresponds to the zero or low capacity setting of the variable port plate 31. The rotor of the fluid pump 25 is connected to drive the accessory drive pulley 16. When the fluid motor unit 26 is in its zero capacity setting as illustrated in FIGURE 2, the inlet ports 59 and 60 will be centered on the minor axis of the cam ring 29.

The fluid will be distributed by the inlet ports 59 and 60 to equal displacement areas on either side of a vane of the rotor as, for example, on either side of the vane illustrated at the minor axis in FIGURE 4. Since the fluid is distributed from inlet ports 59 and 60 to equal displacement areas on either side of a vane of the fluid motor 26, the rotor acts as a shut-off or lock-up valve which prevents relative rotation between cam rings 27 and 29 and the rotor 38 for the fluid pump 25, since there is no outlet for the fluid being pumped by the pump 25. Although the cam ring 29 is rotating with the casing 12 and relative to the fixed rotor 35, the zero capacity of the motor unit will be maintained since the inlet passages 52 and 53 in the port plate 28 and the inlet ports 59 and 60 in the port plate 31 all rotate in unison with cam ring 29.

As the engine r.p.m. builds up beyond the predetermined speed, for example 1500 r.p.m. (corresponding to the optimum r.p.m. for operation of the engine accessory), the governor weights 71 and 72 will overcome the force of the spring 83 and will move out from the axis of the accessory drive unit.

In the position illustrated in FIGURE 3, the inlet ports 59 and 60 will be centered on a line midway between the major and minor axes of the cam ring 29. In this position, as can be seen in FIGURE 4, fluid will be distributed to increasing displacement areas of the rotor 35 as, for example, the areas between the vanes just to the left of the inlet passage 52 as shown in FIGURE 4. With the inlet ports in this position the fluid unit 26 will be at full capacity and the unit 26 will act as a fluid motor adding driving torque to the cam ring 29 (since the rotor 35 is held fixed) and thereby relieving the torque load on the engine shaft 11 to drive the engine accessory through pulley 16. In this manner an increasing relative rotation is allowed between the rotor 38 of the fluid pump 25 and its cam ring 27 since the fluid unit 26 is now acting as a fluid motor and fluid will be emitted from the outlet passages 55 and 56. Since the increasing amounts of relative rotation between the rotor 38 and the cam ring 27 are allowed, the r.p.m. of the pulley 16 driving the engine accessory can be maintained constant as, for example, at 1500 r.p.m. due to the inter-action of the fluid units 25 and 26. This is done by driving the pulley 16 at less r.p.m. than the casing 12 is rotating by allowing relative rotation between rotor 38 and cam ring 27 and then utilizing the fluid unit 26 as a hydraulic motor to aid in turning the casing 12 and thus relieving the torque load on the engine shaft 11.

As previously mentioned, the cavity 19 is completely filled with fluid and this fluid is maintained at a predetermined charge pressure through the action of the piston 20 being urged to the left by the spring 21, as indicated in FIGURE 1. By use of the novel piston arrangement within the casing 12, the need for a charge pump to insure that fluid reaches the interior of the fluid unit 25 as needed is eliminated. Further, by maintaining a completely sealed casing 12 and maintaining a fluid pressure within the casing 12 to eliminate cavitation, the fluid unit is effectively silenced to provide a quieter operating unit.

When the hydraulic unit is operating at higher engine r.p.m. the oil within the cavity 19 will be heated due to the inefficiency of the fluid units. Ribs 17 have been provided on the casing 12 which operate in conjunction with a shroud 18 which will conduct air over the ribs and thus effectively cool the casing 12 and the fluid within it.

From the above it will be apparent that a novel and improved accessory drive unit has been provided which can be utilized to drive an engine accessory at a constant r.p.m. corresponding to its optimum r.p.m. Due to the use of the novel means including piston 20 to maintain a fluid pressure within cavity 19, the accessory drive mechanism 10 does not require a charge pump as is often necessary in hydraulic transmissions.

It will also be apparent that the porting for the fluid units 25 and 26 and the operation of the speed-responsive mechanism 70 can be modified to provide any desired r.p.m. of the accessory drive pulley. It will also be apparent that in certain applications of the accessory drive mechanism 10 the function of unit 25 as a pump and 26 as a motor may interchange.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. An accessory drive mechanism for driving the accessories of an engine comprising a casing driven by the engine, an output shaft mounted in said casing and adapted to drive the engine accessory, a fluid pump unit and a fluid motor unit mounted within said casing and each having a pair of relatively rotatable elements, one element of each pair being rotatably secured with said casing, a second element of one of said pairs being fixed against rotation, the second element of said other pair being drivingly connected to said output shaft, and means mounted within said casing and adapted to vary the displacement of one of said fluid units whereby said output shaft can be driven at variable speed ratios relative to said casing.

2. An accessory drive mechainsm for driving the accessories of an engine comprising a casing driven by the engine, an output shaft mounted in said casing and adapted to drive the engine accessory, a fluid pump unit and a fluid motor unit mounted within said casing and each having a pair of relatively rotatable elements, one element of each pair being rotatably secured with said casing, a second element of one of said pairs being fixed against rotation, the second element of said other pair being drivingly connected to said output shaft, a port plate rotatably mounted in said casing and adapted to be rotated to vary the displacement of one of said fluid units whereby said output shaft will be driven at variable speed ratios relative to said casing as said plate is rotated.

3. An accessory drive mechanism for driving the accessories of an engine comprising a casing driven by the engine, an output shaft mounted in said casing and adapted to drive the engine accessory, a fluid pump unit and a fluid motor unit mounted within said casing and each having a pair of relatively rotatable elements, one element of each pair being rotatably secured with said casing, a second element of one of said pairs being fixed against rotation, the second element of said other pair being drivingly connected to said output shaft, a port plate rotatably mounted in said casing and adapted to be rotated to vary the displacement of one of said fluid units, speed-responsive means driven by said casing and drivingly connected to said port plate adapted to rotate said plate as the speed of said casing varies whereby said output shaft will be driven at a variable speed ratio relative to said casing as the speed of the casing varies.

4. An accessory drive mechanism for driving the accessories of an engine comprising a casing driven by the engine, an output shaft mounted in said casing and adapted to drive the engine accessory, a fluid pump unit and a fluid motor unit mounted within said casing and each having a pair of relatively rotatable elements, one element of each pair being rotatably secured with said casing, a second element of one of said pairs being fixed against rotation, the second element of said other pair being drivingly connected to said output shaft, a port plate rotatably mounted in said casing and adapted to be rotated to vary the displacement of said fluid motor unit, speed-responsive means connected to be driven by said casing and operably associated with said port plate whereby as the speed of the casing varies the port plate will be rotated by the speed-responsive means to change the displacement of said fluid motor unit whereby said output shaft will be driven at a constant speed as the speed of said casing increases beyond a predetermined maximum.

5. An accessory drive mechanism for driving the accessories of an engine comprising a casing driven by the engine, an output shaft mounted in said casing and adapted to drive an engine accessory, a vane-type pump and a vane-type motor disposed in said casing, said pump and motor each comprising a vane motor having vanes therein and a cam ring contacted by said vanes, the cam rings of both the pump and motor being rotatably secured with said casing, the rotor of said motor unit being fixed against rotation, the rotor of said pump being connected to said output shaft, a port plate for said motor rotatably mounted in said casing and adapted to be rotated to vary the displacement of said motor unit, speed-responsive means driven by said casing and connected to said port plate whereby said port plate will be rotated by said speed-responsive means to vary the displacement of said motor unit as the speed of the casing exceeds a predetermined maximum so that the output shaft may be driven at a constant speed as the speed of said casing increases beyond said predetermined maximum speed.

6. An accessory drive mechanism for driving the accessories of an engine comprising a casing driven by the engine and having hydraulic transmission of the pump and motor type mounted within said casing, an output shaft mounted within said casing and connected to said transmission to be driven thereby, said casing including a cavity adapted to be completely filled with hydraulic fluid whereby the fluid substantially surrounds said hydraulic transmission, fluid inlet means on said hydraulic transmission and in contact with said cavity, a piston slidably mounted within said casing, and means urging said piston to decrease the volume of said cavity and thereby maintain a predetermined pressure of the fluid within said cavity to insure an adequate supply of fluid to said hydraulic transmission through said inlet means.

7. An accessory drive mechanism for driving the accessories of an engine comprising a casing driven by the engine and having a hydraulic transmission of the pump and motor type mounted within said casing, an output shaft mounted within said casing and connected to said transmission to be driven thereby, said casing including a cavity adapted to be completely filled with hydraulic fluid whereby the fluid substantially surrounds said hydraulic transmission, fluid inlet means on said hydraulic transmission and in contact with said cavity, a piston slidably mounted within said casing, and a spring engaging said piston and the casing urging said piston to decrease the volume of said cavity and thereby maintain a predetermined pressure of the fluid within said cavity to insure an adequate supply of fluid to said hydraulic transmission through said inlet means and thus eliminate the need of a charge pump for said transmission.

References Cited by the Examiner
UNITED STATES PATENTS

| | | | |
|---|---|---|---|
| 3,069,857 | 12/1962 | Zubaty | 60—53 |
| 3,104,530 | 9/1963 | Teichert | 60—53 |
| 3,108,437 | 10/1963 | Zubaty et al. | 60—53 |

EDGAR W. GEOHEGAN, *Primary Examiner.*